US009729789B2

(12) United States Patent
Horak

(10) Patent No.: US 9,729,789 B2
(45) Date of Patent: Aug. 8, 2017

(54) METHOD OF 3D RECONSTRUCTION AND 3D PANORAMIC MOSAICING OF A SCENE

(71) Applicant: THALES, Courbevoie (FR)

(72) Inventor: Raphael Horak, Elancourt (FR)

(73) Assignee: THALES, Courbevoie (FR)

( * ) Notice: Subject to any disclaimer, the term of this patent is extended or adjusted under 35 U.S.C. 154(b) by 260 days.

(21) Appl. No.: 14/646,712

(22) PCT Filed: Nov. 20, 2013

(86) PCT No.: PCT/EP2013/074277
§ 371 (c)(1),
(2) Date: May 21, 2015

(87) PCT Pub. No.: WO2014/079879
PCT Pub. Date: May 30, 2014

(65) Prior Publication Data
US 2015/0304558 A1 Oct. 22, 2015

(30) Foreign Application Priority Data

Nov. 21, 2012 (FR) .................................... 12 03126

(51) Int. Cl.
*G08G 1/14* (2006.01)
*H04N 5/232* (2006.01)
(Continued)

(52) U.S. Cl.
CPC ....... *H04N 5/23238* (2013.01); *G06T 3/0018* (2013.01); *G06T 3/4038* (2013.01);
(Continued)

(58) Field of Classification Search
CPC ............................. G08G 1/14; H04N 5/23238
See application file for complete search history.

(56) References Cited

U.S. PATENT DOCUMENTS

2009/0243889 A1 10/2009 Suhr et al.

OTHER PUBLICATIONS

Roland Bunschoten, et al., "3D Scene Reconstruciton from Cylindrical Panoramic Images", Robotics and Autonomous Systems, Nov. 30, 2002, pp. 111-118, vol. 41, No. 2-3, Elsevier Science Publishers, Amsterdam, NL, XP004391226.
(Continued)

*Primary Examiner* — Sath V Perungavoor
*Assistant Examiner* — Patricia I Young
(74) *Attorney, Agent, or Firm* — Baker & Hostetler LLP

(57) ABSTRACT

The invention relates to a method of 3D reconstruction of a scene by means of 2D panoramic images of the scene, which comprises a step of processing these images. These images arise from a panoramic system moving in displacement along a determined trajectory, such that the image of at least one point of the scene is in at least 3 successive images obtained according to various directions; the step of processing these 2D successive images comprises the sub-steps:

a) determining reconstruction planes in the scene to be reconstructed,
b) determining, on the basis of pairs of panoramic images and for each pair, rectification planes corresponding to the reconstruction planes and projecting onto each of them a sector of each image of the pair, in a direct manner, so as to obtain two 2D rectified images,
c) matching the two 2D rectified images so as to obtain an intermediate 3D reconstruction,
d) transforming each intermediate 3D reconstruction into a 3D frame including the reconstruction planes so as to obtain a transformed intermediate 3D reconstruction,
e) repeating steps b) to d) on the basis of a new pair of 2D panoramic images and of at least one other rectification plane, so as to obtain at least one other transformed intermediate 3D reconstruction, (Continued)

f) temporally fusing at least two transformed intermediate 3D reconstructions so as to obtain a 3D reconstruction of the scene.

19 Claims, 5 Drawing Sheets

(51) Int. Cl.
*G06T 3/00* (2006.01)
*G06T 3/40* (2006.01)
*H04N 5/341* (2011.01)
*G06T 7/38* (2017.01)
*G06T 7/579* (2017.01)
*G06T 7/593* (2017.01)
*H04N 13/00* (2006.01)

(52) U.S. Cl.
CPC .............. *G06T 7/38* (2017.01); *G06T 7/579* (2017.01); *G06T 7/593* (2017.01); *H04N 5/23229* (2013.01); *H04N 5/3415* (2013.01); *G06T 2200/32* (2013.01); *G06T 2207/10004* (2013.01); *G06T 2207/10032* (2013.01); *G06T 2207/20221* (2013.01); *G06T 2207/30181* (2013.01); *H04N 2013/0088* (2013.01)

(56) References Cited

OTHER PUBLICATIONS

Tony Jebara, et al., "3D Structure from 2D Motion", IEEE Signal Processing Magazine, May 1, 1999, pp. 66-84, vol. 16, No. 3, XP011089836.

Heung-Yeung Shum, et al., "Stereo Reconstruction from Multiperspective Panoramas", Computer Vision, Sep. 20, 1999, pp. 14-21, vol. 1, XP010350473.

Branislav Micusik, et al., "Structure from Motion with Wide Circular Field of View Cameras", IEEE Transaction on Pattern Analysis and Machine Intelligence, Jul. 1, 2006, pp. 1135-1149, vol. 28, No. 7, IEEE, Piscataway, N.J., USA, XP001523475.

METHOD OF 3D RECONSTRUCTION AND 3D PANORAMIC MOSAICING OF A SCENE

CROSS-REFERENCE TO RELATED APPLICATIONS

This application is a National Stage of International patent application PCT/EP2013/074277, filed on Nov. 20, 2013, which claims priority to foreign French patent application No. FR 1203126, filed on Nov. 21, 2012, the disclosures of which are incorporated by reference in their entirety.

FIELD OF THE INVENTION

The field of the invention is that of the 3D reconstruction of a scene on the basis of successive panoramic images of this scene, optionally followed by the 3D mosaicing of this scene.

BACKGROUND

The 3D reconstruction of a scene consists in obtaining, on the basis of successive 2D images of this scene taken from different viewpoints, a so-called 3D reconstructed image such that with each pixel of the reconstructed image, that is to say at any point where the reconstruction declares that there is a scene element, are associated the coordinates of the point of the corresponding scene, defined in a frame X, Y, Z related to this scene.

Conventional mosaicing, so-called 2D mosaicing, consists on the basis of successive images of a scene in projecting them successively onto a principal plane of the scene and in assembling them to produce a mosaic thereof.

Techniques for passive 3D scene reconstruction on the basis of cameras are described in various reference works:
- R. Horaud & O. Monga. Vision par Ordinateur: Outils Fondamentaux, Editions Hermés, 1995. http://www.inrialpes.fr/movi/people/Horaud/livre-hermes.html
- Olivier Faugeras. Three-Dimensional Computer Vision, MIT Press, 1993
- Frédéric Devernay, INRIA Grenoble, course "Vision par ordinateur 3-D". http://devernay.free.fr/cours/vision/
- Tébourbi Riadh, SUP'COM 2005 IMAGERIE 3D 08/10/2007
- "Learning OpenCV: Computer Vision with the OpenCV Library", Gary Bradsky, 2008

These works all cite techniques for 3D scene reconstruction on the basis of pairs of stereoscopic images originating from cameras positioned at different viewpoints, which may either be fixed cameras positioned at various sites in space, or a camera whose position varies temporally, always with the same basic principle of matching the images of the cameras taken 2 by 2 to form a stereoscopic 3D reconstruction of the portion of space viewed by the cameras.

They also explain the principle of epipolar rectification where the focal plane image of each camera is rectified according to the attitude of the camera on a so-called rectification plane so as to facilitate the matching between the images of the stereoscopic pair and enable the 3D reconstruction. The method is relatively optimized by various authors but always relies on the principle that it is firstly necessary to correct the optical distortions of the camera and thereafter to use the relative attitudes of the 2 cameras to determine the rectification plane on the basis of which the matching and the 3D reconstruction are performed.

Other techniques of passive 3D reconstruction exist in the literature, for example the so-called silhouetting techniques, not considered here since they apply to particular cases and require prior knowledge about the scene.

In the techniques of active reconstruction of a scene, it is possible to cite those based on lidar which make it possible to reconstruct the 3D mesh of the scene directly by a distance computation.

Among the reference works may be cited:
- MATIS studies for the IGN: "Using Full Waveform Lidar Data for Mapping of urban Areas", Doctoral thesis, Clément Mallet, 2010
- "Couplage de Données Laser Aéroporté et Photogrammétriques pour l'Analyse de Scénes Tridimensionnelles", Doctoral thesis, Frédéric Bretar, 2006.

An interesting article shows that these techniques have limits in reconstructing 3D objects of complex shape (for example concave): Structuration plane d'un nuage de points 3D non structuré et détection des zones d'obstacles, Vision interface conference, 1999, Nicolas Loémie, Laurent Gallo, Nicole Cambou, Georges Stamon.

Concerning mosaicing, the following reference works may be cited:
- L. G. Brown, "A Survey of Image Registration Techniques", in ACM Computing Surveys, vol. 24, n° 4, 1992,
- "Mosaïque d'images multiresolution et applications", Doctoral thesis, Université de Lyon. Lionel Robinault, 2009.

If one summarizes the prior art relating to 3D reconstruction, it may be said that 3D reconstruction may be partially obtained by using:
Pairs of cameras producing a spatially stereoscopic image of the scene and by fusing these images to produce a 3D reconstruction and optionally a mosaicing of the scene. This solution exhibits several drawbacks:
  the cameras are difficult to calibrate (problems of vibration),
  an inaccuracy in restitution of the 3D reconstruction on account of a stereo base limited by the spacing between the cameras,
  low-field and low-extent restitution on account of the limited optical field of the cameras.

Moreover, the finalized 3D reconstruction is not obvious, since it is constructed by assembling local 3D reconstructions (resulting from the method of stereoscopic restitution of 2, often small-field, images) which may be very noisy on account of the limited number of images which made it possible to construct it, of the limited field of the cameras and of the fact that the reconstruction planes dependent on the respective attitudes of the cameras have a geometry that is difficult to measure accurately (the relative position and relative geometry of the cameras serving to do the 3D reconstruction is often inaccurate in practice when dealing with cameras which are 1 or 2 meters apart and liable to vibrate with respect to one another: this is still more evident when these cameras are motorized). The precise way of assembling the intermediate 3D reconstructions is never described in detail and in practice many errors are noted in the finalized 3D reconstruction which in any event remains small in spatial and angular extent (typically less than 200 m×200 m in spatial extent with an angular extent of typically less than 30°).

Finally the rectification and matching method itself, dependent on the attitudes of the cameras and entailing a preliminary step of derotation of the focal plane in the rectification process, implies that typical cases exist where the 3D reconstruction exhibits holes, especially if the system exhibits temporal rotation motions.

Lastly, the stereoscopic system restores poorly planes which are almost perpendicular to one of the 2 cameras (this is the problem of the restitution of pitched roofs in aerial or satellite stereoscopic imaging).

A moving low-field or mean-field camera, but the 3D reconstruction is limited by the path and the orientation of the camera and is therefore not omnidirectional; moreover, the reconstruction may exhibit holes on account of unchecked motions of the camera or non-overlaps of the latter in the course of its motion. The algorithms used for 3D reconstruction impose a reconstruction in a frame tied or close to the focal plane of the camera, thereby limiting the possibilities of reconstruction (a single principal reconstruction plane and very limited reconstruction when the camera changes orientation). The result of the reconstruction is also very noisy and may exhibit numerous errors on account of the small overlap between images, of a constant plane of reconstruction of the reconstructed scene (and of a camera that could deviate from this plane) and of the use of algorithms which for the 3D reconstruction utilize only two images separated by a relatively small distance. The mosaicing obtained by the ground overlaying of the successive images is inoperative and is not conformal when the scene is not flat and/or comprises 3D elements.

Active sensors, that is to say with telemetry, but here again the 3D reconstruction is not omnidirectional and is not necessarily segmented, the measurements being obtained in the form of scatters of points that are difficult to utilize in an automatic manner. Moreover, the mesh obtained by these active sensors exhibits the drawback of being angularly non-dense (typically fewer than 4 points per $m^2$ for airborne applications at 1 km height). The technique is not at the moment suitable for being able to produce a textured image of the scene and must almost always be corrected manually.

All the previous solutions are unsuitable for obtaining a 3D mosaicing or a 3D reconstruction for a 3D scene of large dimension, that is to say greater than 500 m×500 m. The 3D instantaneous mosaics obtained exhibit deformations and are limited in angular extent (typically <30°) or spatial extent. The assembling of the mosaics is complex when the terrain is 3D and the final result does not conform to the geometry of the scene.

The drawbacks of the procedures of the prior art are not limiting; other drawbacks are described in the patent.

SUMMARY OF THE INVENTION

The aim of the invention is to alleviate these drawbacks.

The proposed solution is based on the use of a panoramic system covering a very large angular sector of the scene and able if so desired to be as large as to cover the complete sphere, and on the utilization of the displacement of the sector in the scene with a processing of the 2D images obtained, so as to reconstruct the 3D information of the scene in the entirety of what has been viewed by the panoramic system and according to various reconstruction planes.

The panoramic system comprises one or more sensors whose images do not necessarily exhibit any mutual overlap, and makes it possible to cover the whole of the scene to be reconstructed instantaneously (with holes if the sensors are not overlapping) or in the course of the motion.

This solution also makes it possible to produce in parallel a mosaic with very large spatial and angular extent representing this scene according to all the viewpoints of the panoramic system in the course of its displacement.

More precisely, the subject of the invention is a method of 3D reconstruction of a scene by means of 2D panoramic images of the scene, which comprises a step of processing these 2D panoramic images. It is principally characterized in that the 2D panoramic images arise from a panoramic system moving in displacement along a determined trajectory, such that the image of at least one point of the scene is in at least 3 successive 2D panoramic images obtained according to various panoramic system-point of the scene directions, and in that the step of processing these 2D successive panoramic images respectively obtained at successive instants comprises the following sub-steps:

a) determining reconstruction planes in the scene to be reconstructed, b) determining, on the basis of panoramic image pairs respectively formed of a 2D panoramic image obtained at an instant t and of another 2D panoramic image obtained at an instant t+Δt and for each chosen pair of images, rectification planes corresponding to the various reconstruction planes chosen and projecting onto each of them a sector of a 2D panoramic image of the pair, in a direct manner, that is to say without passing through one or more intermediate planes dependent on the line of sight of the panoramic system, so as to obtain a 2D rectified image, and projecting onto these same rectification plane and in a direct manner a sector of the other 2D panoramic image of the pair so as to obtain another 2D rectified image, c) matching, for each chosen rectification plane, the two 2D rectified images so as to obtain an intermediate 3D reconstruction in a 3D frame tied to the rectification plane, the so-called intermediate 3D frame, d) transforming each intermediate 3D reconstruction into a 3D frame including the reconstruction planes chosen in a), the so-called 3D reconstruction frame, so as to obtain a transformed intermediate 3D reconstruction, e) repeating steps b) to d) at least once on the basis of a new pair of 2D panoramic images and of at least one other rectification plane, so as to obtain at least one other transformed intermediate 3D reconstruction in this 3D reconstruction frame, f) temporally fusing, for each chosen construction plane, at least two transformed intermediate 3D reconstructions so as to obtain a 3D reconstruction of the scene, g) steps b) to f) are carried out for each reconstruction plane chosen in step a), with the same panoramic images but with different sectors, so as to thus obtain as many 3D reconstructions as reconstruction planes chosen.

This method makes it possible to find the most appropriate dense 3D mesh to represent the scene, such that with each point of this mesh are associated the coordinates of the corresponding point in a frame X,Y,Z tied to the scene.

The repetitions make it possible to have a continuous process for updating the 3D models.

These 3D reconstructions or the intermediate 3D reconstructions can advantageously be fused together spatially so as to update the final 3D reconstruction or reconstructions.

Δt is typically determined as a function of the desired accuracy for the 3D reconstruction.

Each rectification plane is determined as a function of the trajectory of the panoramic system, and is independent of the line of sight of the panoramic system.

This trajectory may be arbitrary and/or determined in tandem with the progress of the 3D reconstruction method.

Each reconstruction plane in the scene is determined experimentally by the operator or automatically as a function of the scene already restored; it can also be determined as a function of the trajectory of the panoramic system, and is independent of the line of sight of the panoramic system.

According to a characteristic of the invention, the panoramic system exhibiting a determined field of vision, the repetition in step e) is performed as long as the point of the scene is in the field of vision of the panoramic system.

The subject of the invention is also a method of mosaicing of a scene, characterized in that it comprises 3D reconstruction steps such as described above and in that textures are associated with each 3D reconstruction, and in that it furthermore comprises the following steps:

A) Choosing one or more projection surfaces on which the mosaic will be constructed, B) If rectified images arising from the 3D reconstruction can be determined, determining them and extracting in these rectified images visible parts with the aid of the 3D reconstruction, and selecting corresponding textures, Otherwise: acquiring a 2D panoramic image, the so-called current panoramic image,
determining sectors of the current panoramic image, extracting in these sectors visible parts with the aid of the 3D reconstruction, and selecting corresponding textures, C) Projecting these textures onto each projection surface and fusing the textures in each projection surface so as to thus obtain a conformal mosaic on each projection surface.

These steps are preferably repeated at each new 2D panoramic image acquisition.

This therefore produces a 3D mosaicing which is a generalization of 2D mosaicing in the sense that the projection can be done on an arbitrary 3D surface, which may itself consist of several plane or non-plane surfaces exhibiting discontinuities. This 3D mosaicing consists, on the basis of successive 2D images of a scene (taken from different viewpoints) and of the 3D reconstruction of the scene in the above sense, in projecting and assembling the various 2D images on the geometric modeling of the 3D reconstruction, thus making it possible to restore the whole of the scene in the form of a textured mosaic overlaid on the various 3D elements of this scene. It makes it possible to restore in a conformal manner an assemblage of images on an arbitrary scene exhibiting relief or 3D elements. The reconstructed 3D mosaic is therefore a textured 3D reconstruction of the scene.

These methods make it possible to carry out a 3D reconstruction and a 3D mosaicing over the widest possible spatial and angular extent.

The invention also relates to an apparatus for 3D reconstruction of a scene, which comprises:

a panoramic system able to form 2D images of the scene, so-called 2D panoramic images, and furnished with location means and, linked to this panoramic system, a computer comprising: means for implementing the method of 3D reconstruction and optionally of mosaicing as defined above, automatic complementary image processing means optionally associated with a man-machine interface or replaced with it.

A simple, accurate method is thus obtained making it possible for example to produce textured maps on which measurements can be performed, to reconstruct the scene over a large spatial (possibly up to as much as 180°×360° and angular extent and in real time, without constraints on the trajectory, on an arbitrary scene (without any plane-scene assumptions and without the aid of any prior scene model for example).

The proposed solution:
makes it possible to afford a compact solution to the problem of 3D reconstruction and/or of mosaicing of the scene by requiring only a single panoramic system, whilst those of the prior art require several independent sensors and are more complex to implement, produces a 3D reconstruction and optionally a mosaic of the scene
which are conformal, that is to say without geometric deformations and therefore superimposable on a map,
over a very wide spatial and angular extent, and without holes,
which are complete, that is to say that can be done according to planes of various directions, this being very different from the conventional methods producing only a single reconstruction plane as output, and not making it possible to restore or restoring poorly objects of the scene having faces different from the chosen restitution plane,
which are robust by virtue of the temporal redundancies implemented,
which are accurate by virtue of the temporal stereovision which on its own produces a virtual stereoscopic base of large dimension, thereby explaining the accuracy,
which are instantaneous, in the sense that the 3D panoramic restitution and the associated mosaic are recomputed and updated at each instant,
which are compatible for example with bottom of the range MEMS attitude platforms when the latter are used to ascertain the trajectory, or with simple means of measurement of relative displacements such as an odometer or a basic GPS,
which are compatible with ample or uncoordinated motions of the sensor, something that a small-field sensor does not allow,
and which applies to any type of trajectory, including curvilinear and in any direction.

Other advantages may be cited, such as:
allows the operator to choose arbitrary reconstruction planes (so as for example to reproduce at one and the same time what is on the ground and on the facades, or according to a cylindrical projection). The solution is also suitable for the reproduction of concave objects, this being very difficult to carry out by other procedures, optionally produces textured reconstructions whereon accurate measurements are possible (the reproduced images are conformal), allows arbitrary motions of the panoramic system in the scene, including coming closer, does not require any external measurement other than those measuring the relative displacement in position and attitude between 2 image shots, with a measurement accuracy compatible with bottom of the range COTS instruments (MEMS platform, basic GPS or odometer,).

does not require any other a priori information about the scene to be reconstructed, allows real-time utilization on a PC.

BRIEF DESCRIPTION OF THE DRAWING

Other characteristics and advantages of the invention will become apparent on reading the detailed description which follows, given by way of nonlimiting example and with reference to the appended drawings in which.

DETAILED DESCRIPTION

The general idea of the invention consists in utilizing to the maximum the frontal angular field (frontal=the direction of whose line of sight traverses a plane in the direction of the motion of the panoramic system) and transverse angular field (transverse=the direction of whose line of sight traverses a plane in the direction perpendicular to the motion of the panoramic system) of a panoramic system moving in a scene according to a known trajectory, to restore, according to various viewpoints, the relief and optionally the texture of this scene.

The utilization of the transverse field is done by reconstructing the relief and optionally the texture according to all the lateral viewpoints viewed by the panoramic system that can be presented to the operator according to various reconstruction planes.

The utilization of the frontal field is done by utilizing the temporal fusion of the previous reconstructions observing the objects of the scene according to different viewpoints. These various reconstructions of an object viewed according to various viewpoints make it possible to produce an extended, accurate and conformal global view of the scene which can be exhibited to an operator according to various viewpoints.

Utilizing temporal stereoscopy in various angular directions that can be produced by the displacement of the panoramic optical (or optronic) system moving in a scene makes it possible to simultaneously produce a 3D reconstruction of the scene projectable according to various directions and optionally a conformal and multi-face mosaic of the scene.

The proposed solution uses the following new concepts:
- temporal stereoscopy with panoramic system, which is differentiated from conventional stereoscopy using two small-field cameras,
- simultaneous rectification according to various planes whose directions are chosen freely, which is differentiated from conventional rectification which is done only on a single plane whose direction is imposed by the direction of line of sight of the two sensors used. Another innovation is direct rectification which is done directly between any part of the 2D image of the panoramic system and the chosen rectification plane, in contradistinction to conventional rectification used in stereovision which imposes an intermediate straightening plane, thereby producing losses of information,
- fusion of intermediate reconstructions utilizing very different directions of line of sight, making it possible to gain accuracy and robustness,
- confidence map related to the hierarchization of the quality of the information extracted from the 2D images aimed at an object of the scene on very different viewpoints and which is directly related to the temporal utilization of the 2D images of a panoramic system in motion.

Figure 1:
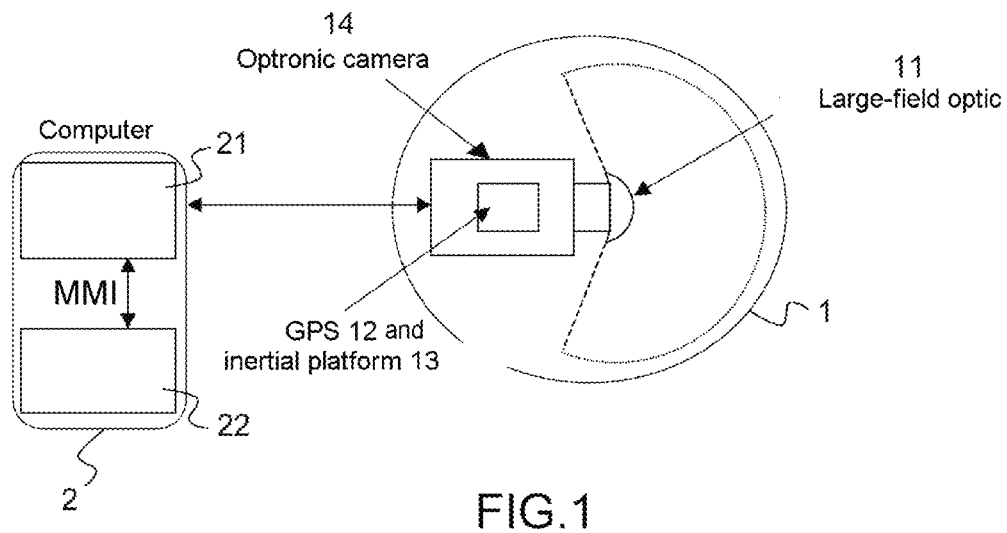
FIG. 1 schematically represents an exemplary apparatus for the implementation of the method of 3D reconstruction and optionally of mosaicing according to the invention, FIG. 2 schematically represents various steps of the 3D reconstruction method according to the invention, FIG. 3 schematically represents various steps of the method of mosaicing according to the invention.

More precisely, the method is implemented by means of an apparatus an example of which is shown in FIG. 1, which comprises:
- a panoramic system 1 able to form 2D panoramic images of the scene, comprising a sensor 14 associated with an optic 11 and furnished with location means such as a GPS 12 and an inertial platform 13, and,
- linked to this panoramic system, a computer 2 comprising:
  - means 21 for implementing the method of 3D reconstruction and optionally of 3D mosaicing such as described, and
  - automatic complementary image processing means optionally associated with, or replaced with, a man-machine interface 22.

According to the invention, the 2D images arise from the panoramic system 1 moving in displacement along a known trajectory, the latter being able to be measured in relative from image to image in tandem with the displacement, by virtue of the location means and the computer 2.

Figure 5:
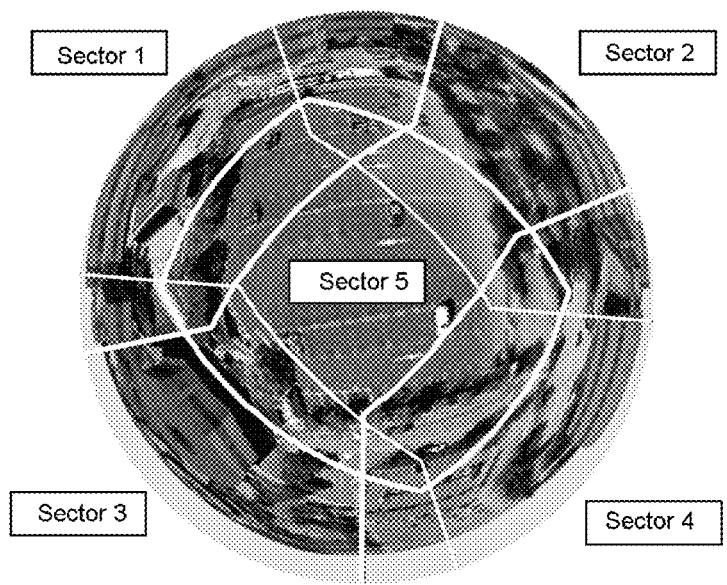
FIG. 5 represents an exemplary sectorial decomposition of a panoramic image resulting from a panoramic system.

The system is panoramic in the sense that it makes it possible to obtain a 2D panoramic image. For this purpose, it can comprise a large-field optic 11 of fisheye type, or any conventional or catadioptric large-field optical means able to provide a 2D panoramic image, or else on the basis of a smaller-field optic but which moves with more or less ample motions so as to sense the various portions of scenes that it is desired to reconstruct in their entirety. A 2D image covering a large field of greater than 60° is for example obtained on the basis of a system 1 with 45° field moving with a motion allowing it to cover this total field of 60°. The choice of the technology of the panoramic system 1 is not limited: it can be passive but it is possible to generalize to an active system as long as the latter makes it possible to implement the step of multi-plane fusion presented hereinabove; this also includes hyper-large-field optics exceeding 360°×180° or complete-sphere optics (for example 2 sensors with back-to-back fisheye optic exploring the complete sphere of observability). This panoramic system can also comprise a set of mutually non-independent optical sensors, together covering a maximum or a determined panoramic angular coverage, for example identical from one image to the next. The set of these optical sensors may not be overlapping, that is to say the global image obtained at an instant by this set is not continuous (may comprise holes), the "holes" being filled in during the displacement of this set. An exemplary 2D panoramic image obtained with an optic of fisheye type, and sectors (5 in this example) is shown in FIG. 5.

The trajectory may be computed in tandem with the displacement of the panoramic system by location means measuring the relative displacements of position and of attitude of the panoramic system in the scene such as GPS 12, inertial platform 13 or the like. This displacement can be controlled by an operator via a man-machine interface 22 or be autonomous. The images thus obtained are such that the image of at least one point of the scene is in at least 3 panoramic images respectively obtained according to various panoramic system-point of the scene directions.

Figure 2:
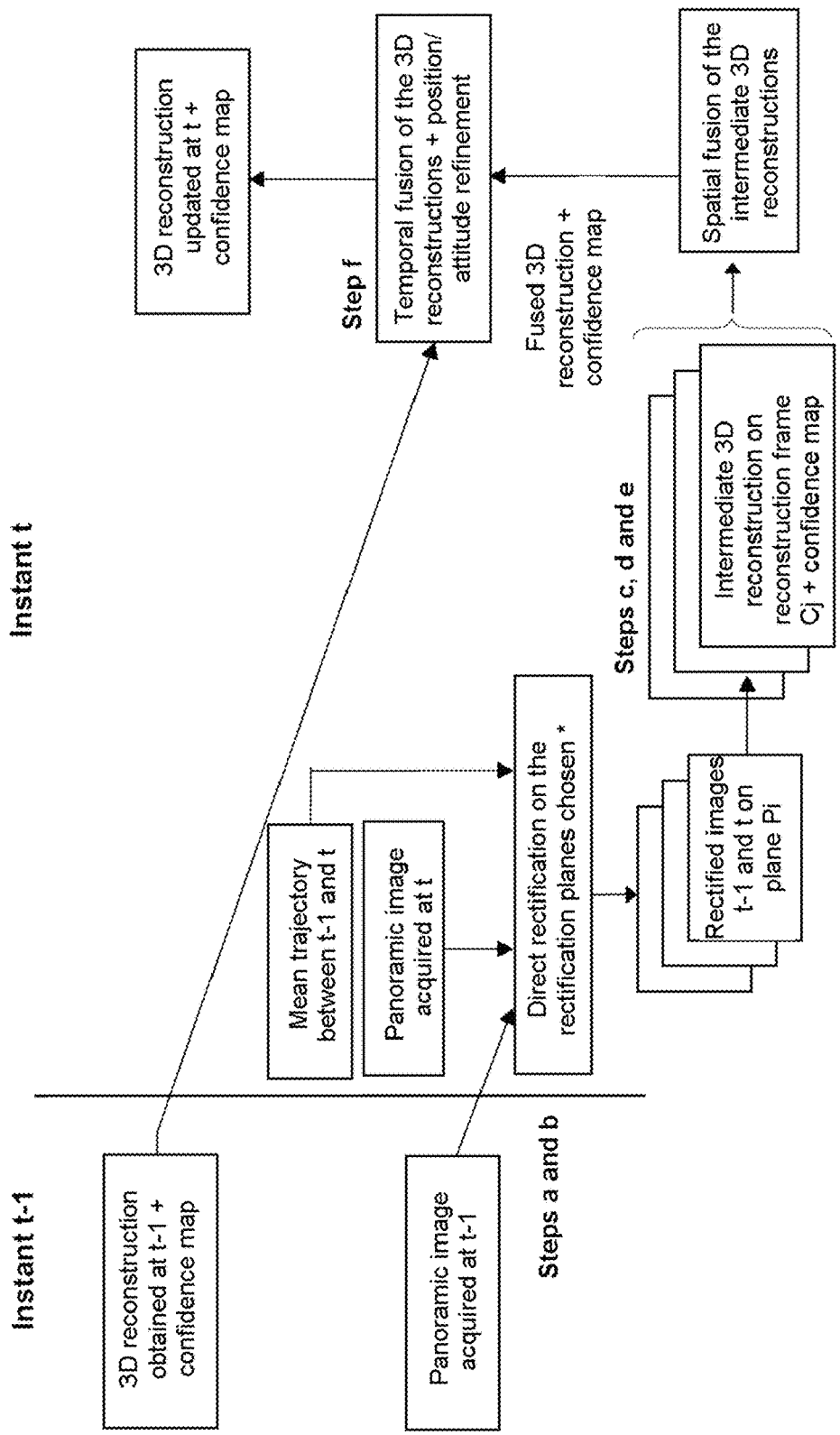

The step of processing these 2D panoramic images respectively obtained at successive instants, by the processing unit 21, comprises the following sub-steps described in conjunction with FIG. 2.

Step a) Determining at least one reconstruction plane (and preferably several) in the scene.

Various reconstruction planes Cj can be chosen so as to establish the 3D reconstructions by bringing to the fore various aspects of the scene, for example to cover the scene over a wide spatial and angular extent, or which will make it possible to have a better representation of the latter. They are chosen freely by the operator or can be determined automatically as a function of the trajectory of the panoramic system, typically around the average of this trajectory computed between two snapshots, and as a function of the complexity of the scene.

Figure 4:
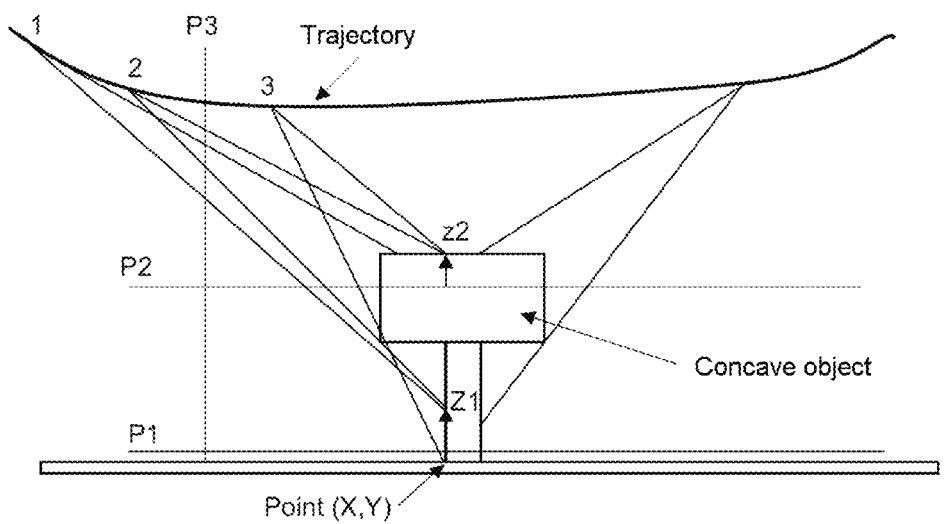
FIG. 4 illustrates measurement ambiguities produced by a concave object when there is only a single reconstruction plane.

In the total absence of an initial 3D reconstruction and in the initialization phase (=1st iteration), by default, the chosen reconstruction planes may be for example the 3 or 4 planes tangent to a cylinder which would surround the mean trajectory of the system, so as to ensure a reconstruction in the various directions visible by the panoramic system. For example, for a horizontal trajectory situated 100 m from the ground, it would be possible to choose the following reconstruction planes: the plane of the ground, a plane perpendicular to the ground and tangent on one side to the cylinder surrounding the trajectory, a plane perpendicular to the ground and tangent on the other side of the cylinder, a plane parallel to the ground situated at a height of greater than 100 m. Once an initial 3D reconstruction begins to be constructed, these previously defined reconstruction planes can be updated so as to approach or merge with the plane surfaces of the reconstruction in progress that are automatically or experimentally extractable by an operator. When a single reconstruction plane does not suffice to give a sufficient 3D representation of the scene, several parallel or perpendicular planes are used to restore the uniqueness and the completeness of the 3D representation. This is the case for example when the scene comprises a concave object, or in the case where a single reconstruction plane provides various measurements of 3D magnitudes dependent on the angle at which the measurement is made, and is consequently incapable of providing a unique measurement, as illustrated in FIG. 4. This figure illustrates the Z-wise reconstruction ambiguity for the point (X,Y): the acquisitions at the positions 1 and 2 of the trajectory reconstruct z1 on the reconstruction plane P1, but the acquisitions at the positions 2 and 3 of the trajectory reconstruct z2 on the same projection plane P1. A new reconstruction plane P2 is then chosen to remove the ambiguity since we will have z1 for P1 and z2 for P2. A plane P3 is also chosen to find the lateral limits of the concave object.

In tandem with the displacement of the panoramic system, when new planes are revealed or disappear in the scene, it may turn out to also be necessary to renew the chosen reconstruction planes.

Step b): A concept of generalized rectification is introduced so as to be able to rectify two successive 2D panoramic images according to an arbitrary direction. These two panoramic images are respectively acquired at an instant t and instant t+$\Delta$t and form a pair of panoramic images.

This rectification consists in computing at least one projection plane which is most suitable for the rectification and in applying the transformation which transforms any sector of each of the two 2D panoramic images on each plane.

Each projection plane serving for the rectification, a so-called rectification plane, can be chosen freely by the operator from among an infinite choice of positions and orientations all parallel to the trajectory of the panoramic system; the plane or each of them is independent of the evolution of the line of sight of the panoramic system (which can pivot on itself in the course of its displacement along its trajectory), in contradistinction to conventional stereoscopy where the rectification plane chosen depends on the evolution of the line of sight and where the choices of rectification planes are very limited.

Figure 7:
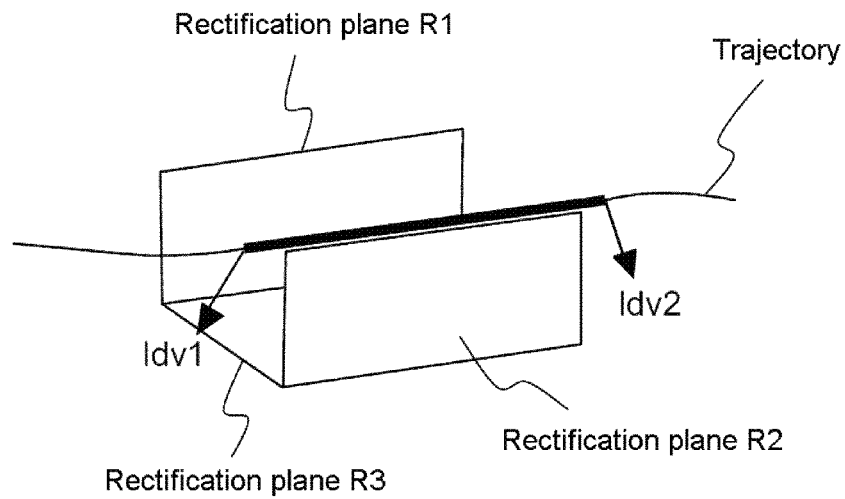

An example of rectification planes referenced R1, R2, R3 is shown in FIG. 7; they are parallel to the trajectory. Also indicated is the direction of the LdV (LdV1, LdV2) of the panoramic sensor at two points of the trajectory, which illustrates the fact that the choice of these planes is independent of the LdV.

Figure 8:
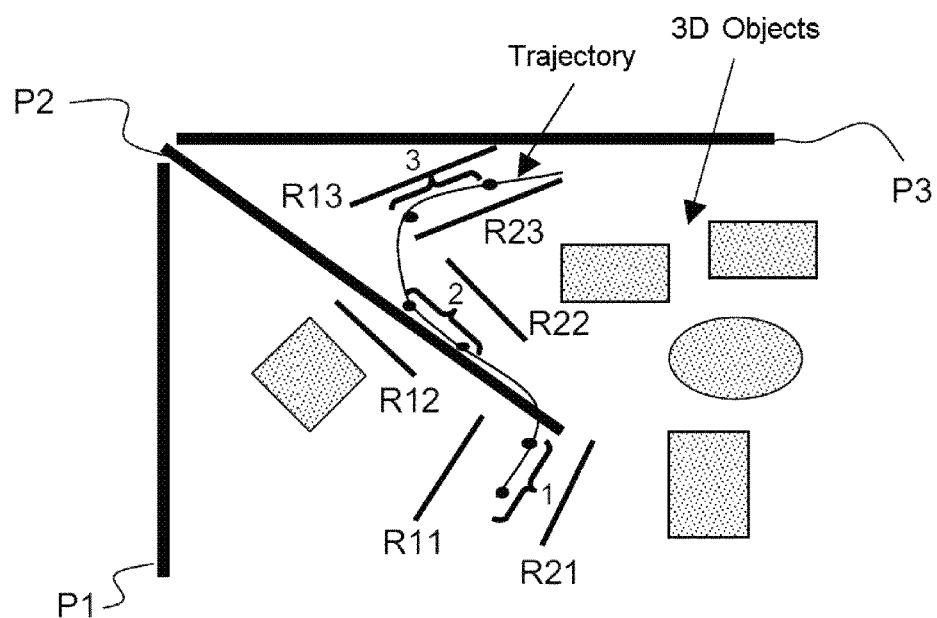

Examples of rectification and reconstruction planes are shown in FIG. 8 which is a view from above of a scene comprising 3D objects. On the trajectory are indicated position pairs (1, 2, 3) of the panoramic sensor corresponding to 3 pairs of panoramic images acquired during this step b); with each position pair are associated two rectification planes (R11, R21 for pair 1, R12, R22 for pair 2 and R13, R23 for pair 3). Three reconstruction planes P1, P2, P3 have been chosen in the example of this figure.

In order to optimize the 3D reconstruction, each chosen rectification plane corresponds to the various reconstruction planes. The rectification plane is for example chosen so as to be the closest (in the geometric sense) to the reconstruction plane determined in step a).

The transformation which passes from the image to the rectification plane is direct, that is to say does not make it necessary to pass through an intermediate step of straightening in a focal plane as in conventional stereovision. This makes it possible to obtain a rectified image which is:
  independent of the rotation motion of the sensor and
  without holes in contradistinction to what may be found in conventional rectification,
  more accurate since it is obtained through a floating direct computation with no intermediate quantized image.

The mathematical steps of this rectification for a panoramic image obtained at the instant t are, in the case of a sensor of fisheye type, the following:

Choosing of a rectification plane $P_i$, of a frame ($\vec{X}_i$, $\vec{Y}_i$, $\vec{Z}_i$) associated with this plane $P_i$, and of a sector of the panoramic image (possibly up to as much as the complete panoramic image if the field of the latter is included in the chosen zone on the rectification plane) to be projected onto this rectification plane, this sector advantageously making it possible to cover the rectification plane to the maximum. If the projected sector of the image does not cover the whole of the panoramic image, the sectors remaining in the image are projected into other rectification planes, as in the example of FIG. 6 where the sector 1 is projected onto a horizontal rectification plane and does not cover the whole of the image to preserve a certain resolution; other vertical rectification planes are necessary to project the other sectors of the panoramic image.

Computation of the transformation which transforms a point (x,y) of the panoramic image into a point ($X_i$, $Y_i$) of the plane $P_i$; use is made for this purpose of the correspondence which exists between the angular direction ($\theta$, $\phi$) of a point of the scene and of the coordinate (x,y) of the corresponding point in the image which depends on the panoramic system chosen. In the case of a rectilinear panoramic system, this relation can be written simply:

If R is the radius of the position of the point (x,y) with respect to the optical center, we have:
tg$\theta$=(y−yc)/(x−xc) where (xc, yc) are the coordinates of the optical center $\phi$=k.R with k=rectilinear factor of the sensor It thereafter suffices to write the equation of the plane $P_i$ as a function of the ($\theta\phi$) found.

For a plane $P_i$ whose normal is oriented according to ($\theta_i$, $\phi_i$), with the focal plane for $\theta_i=\phi_i=0$ as particular case, it may be demonstrated that the following relation holds for the particular case of the centered projection, f being the focal length of the panoramic system:

$$X_i = f \frac{\sin\varphi\cos\varphi_i\cos(\theta - \theta_i) - \cos\varphi\sin\varphi_i}{\sin\varphi\sin\varphi_i\cos(\theta - \theta_i) + \cos\varphi\cos\varphi_i}$$

$$Y_i = f \frac{\sin\varphi\sin(\theta - \theta_i)}{\sin\varphi\sin\varphi_i\cos(\theta - \theta_i) + \cos\varphi\cos\varphi_i}$$

This transformation is an exemplary transformation in the case of a rectilinear panoramic optic (fisheye type); it does not comprise the distortion parameters of the panoramic system which can be computed and compensated elsewhere. The transformation can readily be generalized and adapted to suit any panoramic system having its own optical formula.

It follows that for any point (x,y) of the sector of the panoramic image, it is possible to find its corresponding rectified point in the chosen rectification plane and thus construct the rectified image in this plane.

The various rectification planes chosen in the course of the iterations and the above relation make it possible to define a sectorial rectification on the various rectification planes. A sector of the panoramic image corresponds to an equivalent portion projected onto a rectification plane. The sectorial decomposition of the panoramic image depends on the chosen rectification planes and on the footprint of the projection on these planes.

Figure 6:
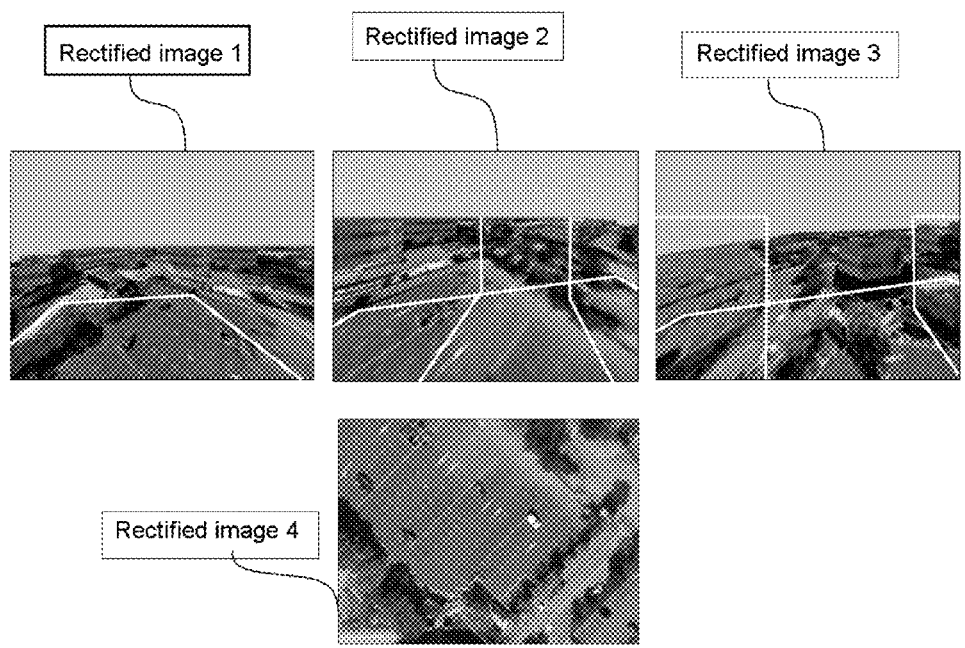
FIG. 6 represents examples of rectified images of sectors of the panoramic image of FIG. 5, projected onto various rectification planes, FIG. 7 schematically represents, for an exemplary trajectory, examples of rectification planes, lines of sight of the panoramic system Ldv1 and Ldv2 being independent of these planes, FIG. 8 schematically represents an exemplary temporal evolution of rectification planes and of 3D reconstruction planes according to the invention, for a given trajectory.

Examples of rectified images are shown in FIG. 6. The first results from the projection of the sector 1 of the image of FIG. 5 onto a vertical rectification plane, the second results from the projection of the sector 2 of the image of FIG. 5 onto another vertical rectification plane, the third results from the projection of the sector 3 onto a different vertical rectification plane from the first two, the fourth results from the projection of the sector 5 onto a horizontal rectification plane.

This projection is repeated in the same rectification plane $P_i$ for a sector of another 2D panoramic image obtained at the instant t+$\Delta$t to obtain another rectified image, $\Delta$t being predetermined experimentally or determined in such a way that the displacement Dc of the system between t and t+$\Delta$t produces a sufficiently large stereo base to be compatible with the accuracy desired for the 3D reconstruction. In the case for example of an overflight at an average distance H from the scene, and assuming for example that minimum disparities of ⅛ pixel (current value) can be measured by the sensor 14, the displacement Dc to obtain the reconstruction accuracy sought $d_H$ is: Dc=(resol/8)*$H^2/d_H$, where resol is the resolution of the sensor 14 (for example 3 mrd for a 1 Mpixel sensor furnished with a fisheye).

In the example cited, and assuming that the reconstruction accuracy sought $d_H$ is 20 cm for H=50 m, Dc must at least be equal to 5 m, thereby corresponding to an angular difference of 6° minimum between 2 acquisitions by the panoramic system.

For the same accuracy $d_H$ and for H=100 m, Dc must at least be equal to 19 m, thereby corresponding to an angular difference of 11° minimum between 2 acquisitions by the panoramic system.

The use of a panoramic system makes it possible to increase the reconstruction accuracy by increasing the distance Dc and the angular separation between two acquisitions, beyond what can be done by a small- or mean-field sensor for one and the same spatial coverage of 3D reconstruction. The stereoscopic base Dc serving for the 3D reconstruction can be larger than that of a conventional stereoscopic method on account of the use of a panoramic field (and of the longer presence of the objects in this field), and this allows the method a greater ultimate reconstruction accuracy, which accuracy is also increased by the fusion of the measurements that the method offers.

By taking the above example of an overflight at a mean distance of 100 m from the scene (ground reconstruction over a field of at least 120° corresponding to a restored band of at least 350 m wide without counting the reconstruction on the sides), the theoretical reconstruction accuracy $d_H$ becomes 10 cm for Dc=38 m and an angular difference of 21°, and 2 cm for Dc=200 m and an angular separation of 60°; it is preferably necessary to take account of the uncertainties of measurements on the relative location between the viewpoints to obtain real $d_H$.

If we take the context of a visual inspection made by a panoramic system with a 1 Mpixel fisheye camera, at a distance H=20 cm from the scene, and assuming a displacement Dc of 10 cm between two acquisitions, then details of 15 μm in height or in depth can be restored ($d_H$=15 μm).

In order to average the various 3D reconstructions obtained during the iterations, and to thus benefit from a significant reduction in the errors and the restitution noise, the real acquisition of the panoramic system can be faster while preserving the displacement between the pairs of 2D rectified images serving to reconstruct the 3D of the scene. The method then consists in taking a first pair of 2D panoramic images on the basis of a displacement Dc, in doing an intermediate 3D reconstruction with this pair, and then in taking another pair of 2D images again on the basis of a displacement Dc at the following acquisition so as to redo an intermediate 3D reconstruction, doing so for as long as the scene points concerned in these various pairs of images remain in the field of the panoramic system.

Step c): The stereoscopic pair of rectified images in the plane $P_i$ is utilized to define an intermediate 3D reconstruction in a frame relating to this $P_i$.

The intermediate 3D reconstruction in a 3D frame tied to the $P_i$, the so-called intermediate 3D frame, is obtained by matching point-to-point the two rectified images in $P_i$, aided by the knowledge of the motion of the panoramic system. This matching is a dense process, which matches, in so far as possible, each of the points of a 2D image of the stereoscopic pair with a point of the other image. It can be carried out by a more or less hierarchized local correlation process and can be aided by matchings carried out at t−$\Delta$t or t-NΔt, N being an integer >1; the large-field nature of the panoramic system and the very possibility of viewing the same scene from a different angle, something which a small-field system used traditionally in stereoscopy does not allow, makes it possible here to remove certain occultations or ambiguities.

Step d): transforming this intermediate 3D reconstruction into a fixed (=absolute) 3D frame including the reconstruction plane (or planes) determined in step a), the so-called 3D reconstruction frame. A transformed intermediate 3D reconstruction is thus obtained.

Step e): repeating steps b) to d) at least once on the basis of a new pair of panoramic images (this may be a new image pair formed on the basis of previous images, or this new pair results from a new acquisition coupled with one of the previously acquired images) and of at least one other rectification plane $P'_i$, to obtain at least one other transformed intermediate 3D reconstruction; the same 3D reconstruction frame as in step d) is kept. These iterations can be successive in the sense that steps b) to d) are strung together successively in this order; these iterations can also be carried out in parallel (several steps b) are carried out in parallel with several rectification planes $P_i$ determined in parallel, etc).

Preferably, these steps b) to d) are repeated as long as at least one reconstructed scene point remains in the field of vision of the panoramic system.

Step f): The transformed intermediate 3D reconstructions are temporally fused by a specific fusion method which utilizes the spatial and temporal redundancies of the intermediate reconstructions. This is obtained by temporally fusing at least two transformed intermediate 3D reconstructions obtained in the 3D reconstruction frame, to obtain a corresponding 3D reconstruction.

Step g): repeating steps b) to f) for each reconstruction plane chosen in a), with the same panoramic images but with different sectors, to thus obtain as many 3D reconstructions as chosen reconstruction planes. These 3D reconstructions or the intermediate 3D reconstructions obtained in the course of these iterations are advantageously fused spatially to update the final 3D reconstruction or reconstructions, and thus increase accuracy and robustness of these reconstructions. The spatial fusion of the 3D reconstructions constructed according to various planes takes account of the accuracy of reconstruction of the various elements of each reconstruction which is not the same according to the various planes and that can be predicted mathematically. This spatial fusion is obtained by utilizing several rectification planes corresponding to the various sectors of each image used.

The set of steps a) to g) are also preferably repeated at least once with new pairs of panoramic images, for example with intermediate images temporally shifted from the previous ones, or with other sectors of the already considered panoramic images. This makes it possible to have a continuous process of updating the final 3D reconstructions. These new pairs of panoramic images may originate from each panoramic image acquisition but not necessarily.

Here again, these iterations can be conducted successively or in parallel.

The utilization of the redundancies and of the quality of the 2D rectified images (quality defined for example by the angular disparity existing between the rectification plane and the reconstruction plane, or else by a confidence coefficient of the matching that led to each intermediate 3D reconstruction) allows the method to produce a confidence map conveying the quality of the final reconstruction. This confidence map is constructed pixel by pixel for each 3D reconstruction, by considering the number of times that each pixel has been constructed and whether the conditions of this construction were good, these being defined for example as a function of an experimentally or mathematically determined threshold of matching quality. Also considered are the cases where several 3D magnitudes are obtained for one and the same pixel as a function of the angle of observation, in which case additional rectification and reconstruction planes are created to remove the ambiguity, for example for concave objects which require more than one reconstruction plane in order to be reconstructed correctly, as in the example of FIG. 4.

We now consider the mosaicing of the 2D images of the scene, the composition of these 2D images forming a global image called a mosaic. This mosaic generally comprises several 2D textured planes present in the 3D scene or which approximate it, but may also be on a 3D surface.

The utilization of the 3D reconstruction of the scene created progressively makes it possible to project each 2D image originating from the sectorial decomposition of the 2D panoramic image onto various projection planes (or surfaces) also called mosaicing planes. These projection surfaces are the surfaces on which the mosaicing is constructed; they may be chosen freely by the operator or may be determined automatically on the basis of the 3D reconstruction. As indicated hereinabove, some of these surfaces may be warped (curved) or even be a 3D surface the modeling of which is known.

In the case of a panoramic system viewing a highly 3D scene exhibiting various faces, several mosaicing planes (or surfaces) can (and beneficially may) be chosen. By highly 3D scene is meant a scene containing many 3D elements producing significant disparities between two successive acquisitions, as is the case for example for a drone overflying an urban setting at low flight height. The method of mosaicing utilizes the fact that the projection surfaces or planes have different orientations so as to best project the textures of the images onto each of the projection surfaces or planes. It is recalled that the texture is a set of intensities of pixels over an image region.

The utilization of the 3D reconstruction makes it possible to also preserve only the visible parts of the projected images. This makes it possible to avoid projecting onto a mosaicing plane portions of images which would belong to other portions of the scene.

The multi-plane (or multi-surface) projection mosaicing process is preferably repeated at each new 2D image acquisition performed by the panoramic system, and the new mosaic is fused with the old one (obtained at t-1) so as to update the latter.

The result of these various projections and of the continuous fusion of the mosaics is a conformal image (that is to say with no geometric deformations) that is very extended over each projection plane. This results directly from the fact that the method of 3D mosaicing, explained hereinbelow in detail and described in conjunction with FIG. 3, simultaneously computes the 3D reconstruction of the scene and the projections of the textures on it, that the method eliminates the hidden parts or the poorly resolved parts in the projection and that this method is repeated in all directions and following the whole of the trajectory.

The 3D reconstruction of the scene and the projections of the textures on it are computed at each so-called initial 2D image acquisition, an acquisition being separated from the previous one by a time interval Δt defined above.

According to an alternative, the 3D reconstruction of the scene and the projections of the textures on it are computed at each image acquisition of the panoramic system and at high frequency on the basis of previous images stored earlier. More precisely: the intermediate images lying between two successive images separated by Δt serving for the 3D reconstruction are stored in such a way as to be able to also be used for the 3D reconstruction in the manner of a FIFO, the acronym standing for "First In First Out" (each new image acquired is compared with the first image stored so as to establish a new instance of 3D reconstruction, this first image is thereafter erased from the list and the last one added to the updated list). Moreover, the intermediate images may also serve to facilitate the correspondence between the first and last image, or serve to fill "holes" in the 3D model.

Figure 3:
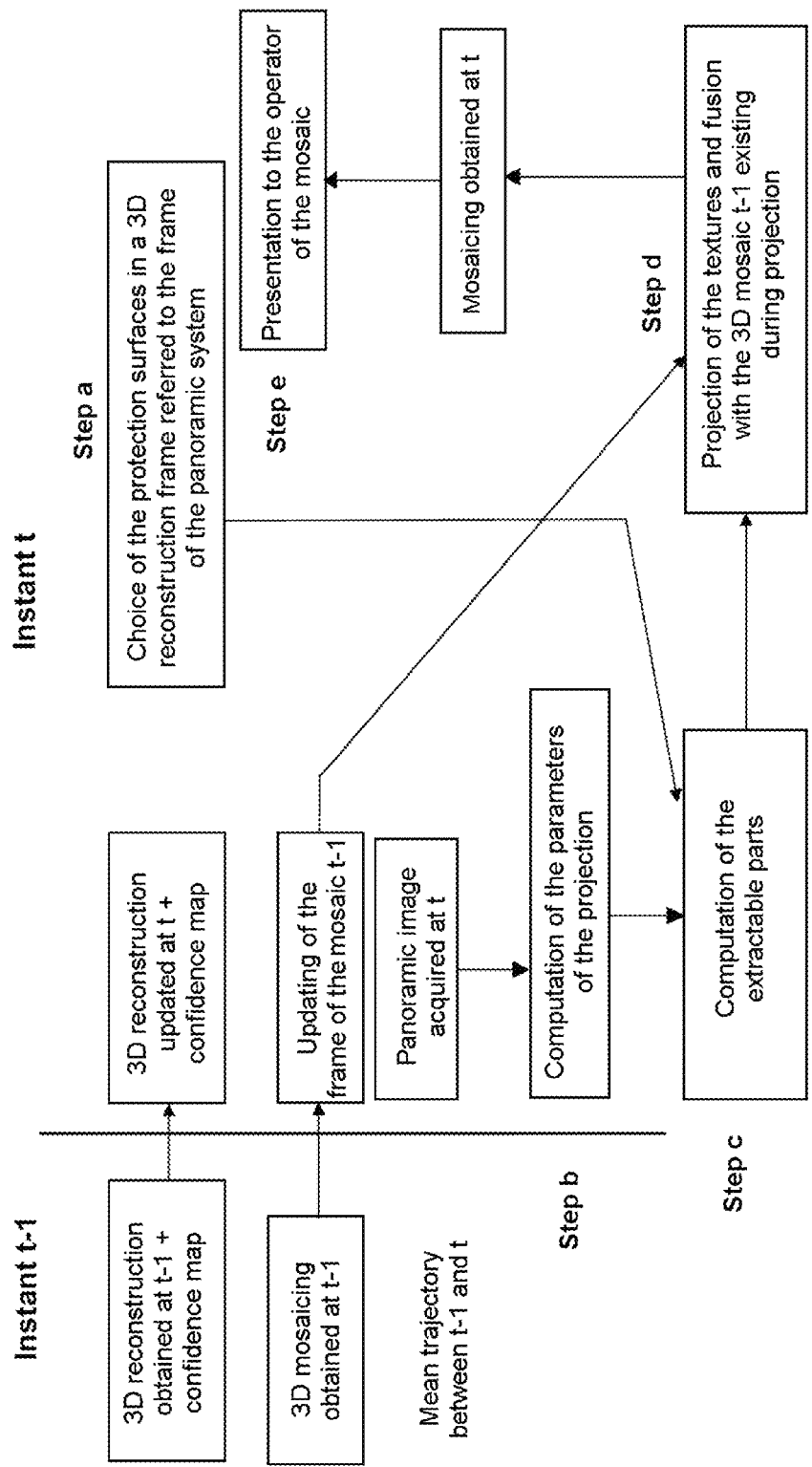

A mosaic is then obtained on completion of the following steps A) to E) described in conjunction with FIG. 3, for each new 2D image acquired by the panoramic system.

According to a first embodiment, the 3D reconstruction and the mosaicing are performed in a successive manner after each acquisition; this assumes that a new 3D reference reconstruction has just been performed subsequent to (one or more) 3D reconstructions already performed.

According to a second embodiment, the 3D reconstruction and the mosaicing are performed in parallel after each acquisition; this assumes that the mosaicing is performed whilst a new 3D reconstruction is still in progress, in which case the 3D reference reconstruction is that performed at one of the previous acquisitions of 2D images, or indeed a 3D reconstruction performed previously.

These various steps will be described in greater detail.

A) Choosing 3D projection planes (or surfaces).

This first step consists in choosing the 3D projection planes or surfaces on which the mosaic is constructed. These 3D projection planes or surfaces can be chosen freely by the operator at a given moment of the mosaicing or computed automatically on the basis of the current (or reference) 3D reconstruction of the scene according to predetermined criteria (for example planes parallel to the reconstructed surface of the ground or principal planes extracted from the 3D reconstruction). 3D projection surfaces may also be used if the scene lends itself thereto and if the operator sees a benefit therein; this makes it possible for example to represent objects of the scene or a scene background which have particular geometric shapes, but this in no way detracts from the conformity that could be obtained by multiple projections that would be exclusively plane.

B) Determining rectified images or associated sectors in the panoramic image.

When rectified images have been computed during one or more previous 3D reconstructions, the closest (in the geometric sense) to the projection plane is chosen and the parameters of the direct projection (with no intermediate step) onto the projection plane are computed.

If this rectified image is too far away, that is to say is not close to the projection plane with respect to a threshold predetermined by the operator for example, a 2D panoramic image, the so-called current 2D panoramic image, is acquired and the parameters of the direct projection of this current 2D panoramic image onto the projection plane and the sectors of this current image which will be used during the direct projection of step D are computed.

In the two typical cases, the projection is not performed straight away but the projection parameters are placed in memory in order to be used by step D).

C) Determining the utilizable parts (that is to say that have sufficient resolution) that can be used for the projection of step D, with the aid of the 3D reconstruction to compute the hidden parts in the projection plane on the basis:

of the 2D rectified image if the first case of step B applies, or of the sectors of the current panoramic image which will be used in the direct projection, if the second case of step B applies.

The 3D reconstruction that has just been computed makes it possible to automatically compute the hidden or weakly resolved parts (and conversely the utilizable visible parts) in the projection plane which would result from maskings present in the scene. This amounts to selecting the textures to be preserved in the mosaic. This computation is accurate because the 3D reconstruction has been constructed firstly in the frame tied to the panoramic system.

One of the particular features of the 3D mosaicing according to the invention is to profit from the computation of the hidden parts so as to eliminate on the various projection planes the masks generated by the scene and to consider on these planes only the visible parts. This makes it possible to temporally mosaic only parts of scenes which are always visible and thus to avoid deformations due to the projection of parts of the scene not belonging to the projection plane (defect present in a conventional mosaicing which from the outset projects the whole of the image onto the projection plane without being able to take account of the maskings by the elements of the scene evolving in tandem with the displacement of the sensor).

D) Projecting the textures selected in the previous step onto the 3D projection planes or more generally onto the 3D projection surfaces and fusing the textures in each 3D projection plane or surface so as to thus obtain a conformal mosaic on several planes.

The textures selected in the previous step are projected onto the projection planes (or surfaces), and fused temporally with the current mosaic to form a new mosaic.

It is important to note that, by projecting onto surfaces or planes arising from a 3D reconstruction built on the basis of the same base images as those serving to project the textures, very high accuracy in projection (and in the geometric transformations between image frame and frame of the reconstructed scene) is made possible. It is also this which ensures the conformity of the mosaicing produced. But the principal element of conformity results from the fact that the mosaicing utilizes a 3D reconstruction carried out in the same frame as the mosaic and uses only the portions of images that are not masked in its mosaic process. In the case where an external 3D reconstruction were used which did not arise from the base images serving for the projection, there would necessarily be uncertainties in the relative position of the sensor in relation to the scene and in the overlap of the projection.

E) Presenting the mosaic to the operator according to various planes or more generally according to various 3D presentation surfaces, by projecting the textured 3D reconstruction (or reconstructions) onto these presentation planes. These presentation planes are chosen freely by the operator and serve solely to present the results of the mosaic according to various perspectives chosen by the operator. The mosaic can be presented to the operator presentation plane by presentation plane, or according to the planes representing the unfurling of the curved surfaces onto which the textures have been projected (in the case of a projection onto a cylinder for example). The textured 3D result can obviously also be presented directly in 3D virtual form using suitable software. The projection result provides an ever conformal image, this not necessarily being the case, as has been explained, with a conventional mosaicing method.

This omnidirectional simultaneous 3D reconstruction and mosaicing method is not limited to an optical panoramic system. It is very possible to utilize the textures measured over a large directional field by a means other than optical, for example by an active means of lidar or sonar type; the method could then also utilize the distances given by the instruments.

Among industrial applications may be envisaged:
the real-time 3D and textural restitution of a scene overflown by a drone or an aircraft (application to the production of 3D maps, of orthophotographs, application to surveillance, etc.),
aid to terrestrial or airborne navigation,
industrial, medical or other visual inspection.

The invention claimed is:

1. A real-time method of 3D reconstruction of a scene, without a priori information about the scene, by means of 2D panoramic images of the scene, which comprises a step of processing these 2D panoramic images, characterized in that the 2D panoramic images arise from a panoramic sensor moving in displacement over an unconstrained 3D trajectory, such that the image of at least one point of the scene is in at least 3 successive 2D panoramic images obtained according to various panoramic system-point of the scene directions, and in that the step of processing these 2D successive panoramic images respectively obtained at successive instants comprises the following sub-steps:
   a) determining or updating, at each new acquisition, reconstruction planes of different directions in the scene to be reconstructed,
   b) determining, on the basis of pairs of panoramic images sliced up into sectors covering in totality each of the panoramic images, respectively formed of a 2D panoramic image obtained at an instant t and of another 2D panoramic image obtained at an instant t+Δt and for each chosen pair of images, rectification planes corresponding to the various chosen reconstruction planes, determining the various sectors in the two panoramic images corresponding to the various reconstruction planes, and projecting onto each of the rectification planes the corresponding sector of a 2D panoramic image of the pair, in a direct manner, that is to say by applying a mathematical transformation which causes each pixel of each sector of the panoramic image to pass directly into a corresponding pixel in the corresponding rectification plane without passing through an intermediate step of projection onto focal plane, so as to obtain a 2D rectified image, and projecting onto these same rectification plane and in a direct manner a sector of the other 2D panoramic image of the pair so as to obtain another 2D rectified image,
   c) matching, for each chosen rectification plane, the two 2D rectified images so as to obtain an intermediate 3D reconstruction in a 3D frame tied to the rectification plane, the so-called intermediate 3D frame,
   d) spatially fusing the intermediate 3D reconstructions,
   e) transforming each fused intermediate 3D reconstruction into a 3D frame including the reconstruction planes chosen in a), the so-called 3D reconstruction frame, so as to obtain a transformed intermediate 3D reconstruction,
   f) repeating steps b) to e) at least once on the basis of a new pair of 2D panoramic images and of at least one other rectification plane, so as to obtain at least one other transformed intermediate 3D reconstruction in this 3D reconstruction frame,
   g) temporally fusing, for each chosen construction plane, at least two transformed intermediate 3D reconstructions to obtain a 3D reconstruction of the scene, and
   h) steps b) to g) are carried out for each reconstruction plane chosen in step a), with the same panoramic images but with different sectors, so as to thus obtain as many 3D reconstructions as chosen reconstruction planes.

2. The method of 3D reconstruction of a scene as claimed in claim 1, wherein steps a) to h) are repeated at least once with new panoramic images different from those already used, so as to thus obtain at least one other 3D reconstruction of the scene.

3. The method of 3D reconstruction of a scene as claimed in claim 1, wherein the 3D reconstructions obtained according to different reconstruction planes are spatially fused.

4. The method of 3D reconstruction of a scene as claimed in claim 1, wherein the reconstruction planes are chosen freely by an operator.

5. The method of 3D reconstruction of a scene as claimed in claim 1, wherein each reconstruction plane is determined automatically as a function of the trajectory.

6. The method of 3D reconstruction of a scene as claimed in claim 1, wherein the trajectory is determined in tandem with the steps of 3D reconstruction.

7. The method of 3D reconstruction of a scene as claimed in claim 1, wherein each reconstruction plane is determined as a function of the 3D reconstruction that has just been established and as a function of the scene scanned by the sensor.

8. The method of 3D reconstruction of a scene as claimed in claim 1, wherein each rectification plane is determined as a function of the trajectory of the panoramic system, and independently of the line of sight of the panoramic system.

9. The method of 3D reconstruction of a scene as claimed in claim 1, wherein the panoramic system exhibiting a determined panoramic field, the set of the sectors associated with the rectification planes covers the whole of this panoramic field.

10. The method of 3D reconstruction of a scene as claimed in claim 1, wherein Δt is determined as a function of a required 3D reconstruction accuracy.

11. The method of 3D reconstruction of a scene as claimed in claim 1, wherein the panoramic system exhibiting a determined panoramic field, the repetition of step e) is performed as long as the point of the scene is in the panoramic field of the panoramic system.

12. The method of 3D reconstruction of a scene as claimed in claim 1, characterized in that it comprises a step of producing a confidence map related to a number of times that a point of the scene is viewed and reconstructed.

13. The method of 3D reconstruction of a scene as claimed in claim 1, wherein the panoramic system comprises at least one optical sensor.

14. The method of 3D reconstruction of a scene as claimed in claim 1, wherein the panoramic system comprises at least one active sensor of lidar or sonar type.

15. The method of 3D reconstruction of a scene as claimed in claim 1, wherein the panoramic system comprises several sensors able together to reproduce a maximum panoramic angular coverage.

16. The method of 3D reconstruction of a scene as claimed in claim 1, wherein the panoramic system is immersed in the scene.

17. The method of 3D reconstruction of a scene as claimed in claim 1, wherein the concave objects of the scene having several 3D inclines according to the angle of observation, rectification planes and additional reconstruction planes are added so as to remove the ambiguity of the inclines.

18. An apparatus for 3D reconstruction of a scene, which comprises a panoramic system able to form images of the scene, furnished with relative image to image location means and, linked to this panoramic system, a computer comprising means for implementing the 3D reconstruction method as claimed in claim 1, and image processing means.

19. The method of 3D reconstruction of a scene as claimed in claim 1, wherein the panoramic system covers the whole of the space and of the scene around the sensor.

* * * * *